United States Patent
Liu et al.

(10) Patent No.: US 12,119,942 B2
(45) Date of Patent: Oct. 15, 2024

(54) SYSTEMS AND METHODS FOR DETERMINING FEEDBACK CODEBOOK

(71) Applicant: ZTE CORPORATION, Guangdong (CN)

(72) Inventors: Xing Liu, Shenzhen (CN); Peng Hao, Shenzhen (CN); Xianghui Han, Shenzhen (CN); Wei Gou, Shenzhen (CN); Kai Xiao, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 391 days.

(21) Appl. No.: 17/590,516

(22) Filed: Feb. 1, 2022

(65) Prior Publication Data

US 2022/0158774 A1    May 19, 2022

Related U.S. Application Data

(63) Continuation of application No. PCT/CN2019/099241, filed on Aug. 5, 2019.

(51) Int. Cl.
*H04L 1/1829* (2023.01)

(52) U.S. Cl.
CPC .................. *H04L 1/1854* (2013.01)

(58) Field of Classification Search
None
See application file for complete search history.

(56) References Cited

U.S. PATENT DOCUMENTS

| | | | | |
|---|---|---|---|---|
| 10,298,351 B2* | 5/2019 | Li | | H04L 1/1607 |
| 10,959,250 B2* | 3/2021 | Yang | | H04W 24/08 |
| 11,930,507 B2* | 3/2024 | Zhang | | H04L 1/1685 |
| 2009/0067379 A1 | 3/2009 | Kim et al. | | |
| 2018/0176939 A1 | 6/2018 | Guan et al. | | |
| 2020/0021400 A1* | 1/2020 | Cherian | | H04L 5/0055 |
| 2020/0229208 A1* | 7/2020 | Quan | | H04W 72/1268 |
| 2020/0322971 A1* | 10/2020 | Jung | | H04W 72/23 |
| 2020/0344805 A1* | 10/2020 | Hosseini | | H04L 1/1812 |
| 2021/0006376 A1* | 1/2021 | Cirik | | H04L 5/0094 |

(Continued)

FOREIGN PATENT DOCUMENTS

| | | |
|---|---|---|
| CN | 106612557 A | 5/2017 |
| CN | 109314614 A | 2/2019 |

(Continued)

OTHER PUBLICATIONS

Second Office Action and Search Report on CN App. No. 2019800989490 dated Oct. 24, 2023 (with English translation, 15 pages).

(Continued)

*Primary Examiner* — Phirin Sam
(74) *Attorney, Agent, or Firm* — Foley & Lardner LLP

(57) ABSTRACT

Systems and methods for wireless communications are disclosed herein. In one embodiment, a wireless communication device determines that first feedback information indicated to transmit on a first uplink (UL) resource is canceled. The wireless communication device combines the first feedback information with second feedback information indicated to transmit on a second UL resource to generate combined feedback information. The wireless communication device transmits the combined feedback information using the second UL resource.

18 Claims, 9 Drawing Sheets

(56) References Cited

U.S. PATENT DOCUMENTS

| | | | |
|---|---|---|---|
| 2021/0037413 A1* | 2/2021 | Babaei | H04W 28/0278 |
| 2021/0195623 A1* | 6/2021 | Xu | H04W 72/569 |
| 2021/0243790 A1* | 8/2021 | Ji | H04L 1/1896 |
| 2022/0182281 A1* | 6/2022 | Cirik | H04W 24/08 |
| 2022/0201727 A1* | 6/2022 | Gong | H04L 5/0055 |
| 2022/0217760 A1* | 7/2022 | Iyer | H04L 5/0053 |
| 2022/0255707 A1* | 8/2022 | Papasakellariou | H04L 1/1858 |
| 2023/0047403 A1* | 2/2023 | Xiong | H04L 5/0055 |
| 2023/0318792 A1* | 10/2023 | Cirik | H04L 5/001 370/330 |
| 2023/0413274 A1* | 12/2023 | Wu | H04L 5/0055 |
| 2024/0015723 A1* | 1/2024 | Yang | H04L 5/0053 |

FOREIGN PATENT DOCUMENTS

| | | |
|---|---|---|
| CN | 109600212 A | 4/2019 |
| CN | 109802764 A | 5/2019 |
| WO | WO-2019/095799 A1 | 5/2019 |

OTHER PUBLICATIONS

First Office Action for CN Appl. No. 201980098949.0, dated Apr. 18, 2023 (with English translation, 16 pages).

Extended European Search Report for EP Appl. No. 19940250.4, Dated Jul. 1, 2022 (7 pages).

Interdigital Inc., "On UCI enhancements for URLLC" 3GPP TSG RAN WG1 #96bis, R1-1904883, Apr. 8, 2019, Xi'an, China (5 pages).

Nokia et al., "On the open aspects of HARQ management" 3GPP TSG RAN WG1 NR Ad-Hoc #3, R1-1715546, Sep. 18, 2017, Nagoya, Japan (9 pages).

ZTE, "UL control enhancements for URLLC" 3GPP TSG RAN WG1 #96, R1-1901768, Feb. 25, 2019, Athens, Greece (9 pages).

International Search Report and Written Opinion for PCT Appl. No. PCT/CN2019/099241, mailed Apr. 24, 2020 (8 pages).

OPPO UCI enhancements for URLLC 3GPP TSG RAN WGl #96bis, R1-1904043, Apr. 12, 2019.

* cited by examiner

SYSTEMS AND METHODS FOR DETERMINING FEEDBACK CODEBOOK

CROSS-REFERENCE TO RELATED APPLICATION

This application claims the benefit of priority under 35 U.S.C. § 120 as a continuation of PCT Patent Application No. PCT/CN2019/099241, filed on Aug. 5, 2019, the disclosure of which is incorporated herein by reference in its entirety.

TECHNICAL FIELD

The present disclosure relates to the field of telecommunications, and in particular, to determining a feedback codebook in a communication system.

BACKGROUND

In considering uplink (UL) transmission resource multiplexing for different terminals (e.g., user equipment (UE)) in existing wireless communication systems, a physical UL control channel (PUCCH) or a physical UL shared channel (PUSCH) carrying low-priority service UL control information (UCI) that collide with high-priority UL service transmissions of other UEs may be canceled. As a result, the UCI cannot be transmitted using original resources, which are occupied by the high-priority UL service transmissions.

Hybrid automatic repeat request (HARD)-acknowledgement (ACK) is a type of UCI. HAQ-ACK can be used to provide feedback to a base station regarding whether downlink (DL) data is successfully received. The HARQ-ACK feedback information of multiple DL transmissions can be aggregated into a HARQ-ACK codebook. The codebook size depends on a number of corresponding DL time slots, code block group transmission configuration, a number of codewords, and a number of component carriers.

Responsive to the HARQ-ACK feedback information being canceled, the base station triggers the retransmission of all DL transmissions corresponding to the HARQ-ACK feedback information, because the base station cannot determine the receiving status (successfully received or otherwise) for those DL transmissions at the terminals, thus negatively affecting DL transmission efficiency.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

In some embodiments, a wireless communication method includes determining, by a wireless communication device, that first feedback information indicated to transmit on a first UL resource is canceled, combining, by the wireless communication device, the first feedback information with second feedback information indicated to transmit on a second UL resource to generate combined feedback information, and transmitting, by the wireless communication device, the combined feedback information using the second UL resource.

In some embodiments, a wireless communication method includes determining, by a base station, that first feedback information indicated to transmit on a first uplink UL resource is canceled, receiving, by the base station from a wireless communication device, combined feedback information including the first feedback information and second feedback information. The combined feedback information is received on second UL resource originally indicated for transmitting the second feedback information. The first feedback information provides feedback for first DL data transmitted to the wireless communication device. The second feedback information provides feedback for second DL data transmitted to the wireless communication device.

The above and other aspects and their implementations are described in greater detail in the drawings, the descriptions, and the claims.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

DETAILED DESCRIPTION OF EXAMPLE EMBODIMENTS

Figure 1:
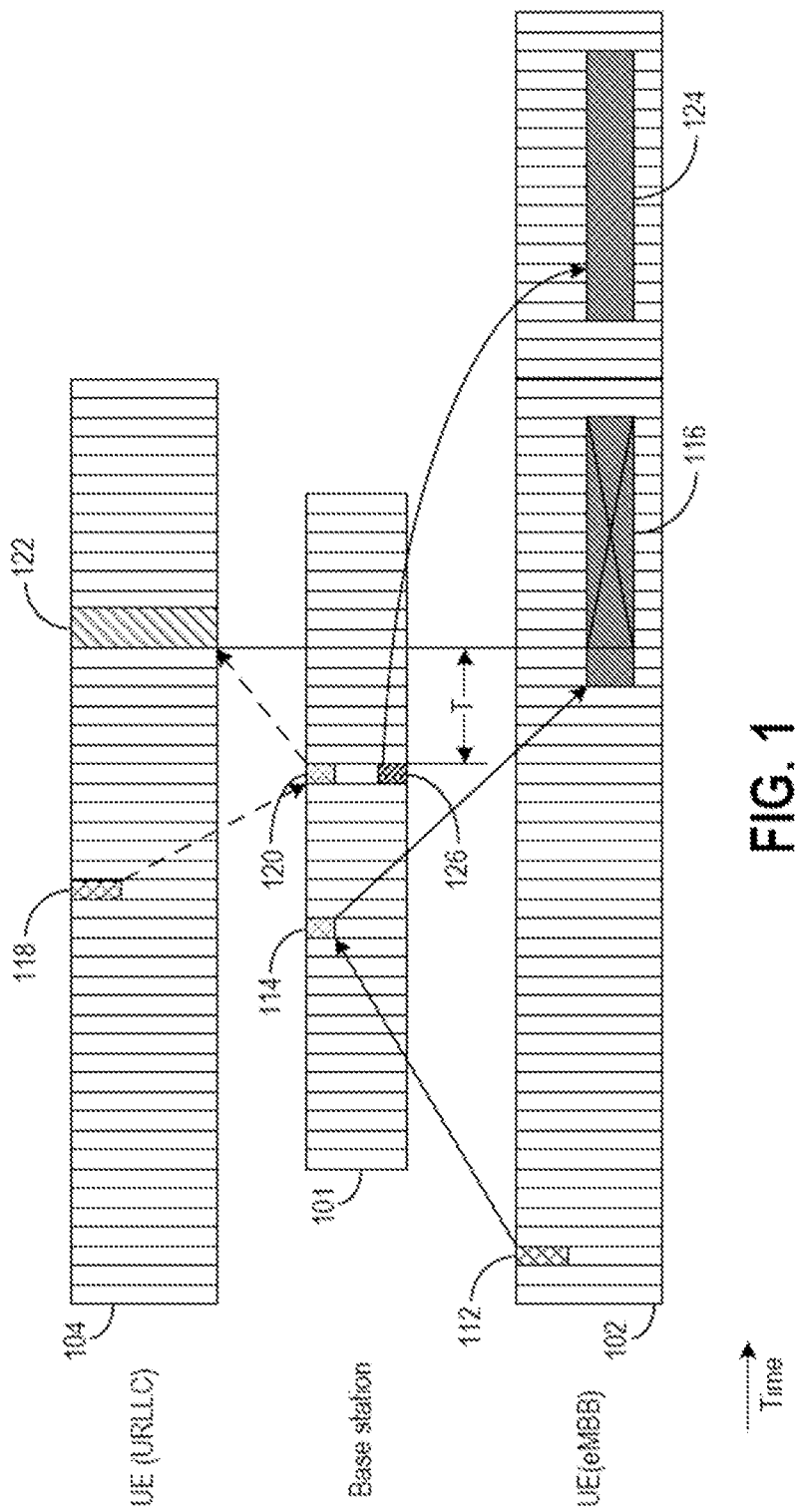
FIG. 1 is a schematic diagram illustrating a scenario in which PUSCH is usurped, in accordance with some embodiments of the present disclosure.

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

The present disclosure relate to systems, methods, non-transitory computer-readable media, and apparatuses are for determining feedback codebooks to reduce impact of DL data transmission inefficiency due to cancelation of UL feedback information. The UL feedback information (e.g., UCI) may be canceled as the resources for transmitting the UL feedback information is preempted or otherwise taken by UL service transmissions having higher priority than that of the UL feedback information.

Referring generally to the FIGS., the feedback codebook is determined by combining or margining canceled feedback information with previous feedback information or subsequent feedback information to form a feedback codebook. The method by which the canceled feedback information is combined with the previous feedback information or the subsequent feedback information includes at least one subjecting the feedback bits corresponding to the same data to an "OR" operation to determine feedback information of the data in the combined codebook. The method further includes, among other features, determining the feedback information of the data in the combined codebook based on whether the data is correctly received by the UE. The method further includes, among other features, defining a time threshold N. Responsive to determining that a time interval between an end position of the data and a start position of feedback resource is less than N, feedback NACK is provided with respect to the data. Responsive to determining that the end position of the data and the start position of the feedback resource is greater than or equal to N, the feedback information for the data in the combined codebook is determined based on whether the data is received correctly. The time threshold N is related to or determined based on a processing capability of the UE.

In some implementations, the method further includes adding a feedback bit to the combined feedback codebook. The newly added feedback bit is the feedback of the data corresponding to only the canceled feedback information (e.g., the data scheduled in slot n of the first implementation). In some implementations, a sequence or an order by which the feedback information is arranged in the feedback codebook is determined using one of various methods. One of the methods includes determining an order of the feedback information in the feedback codebook according to a sequence of time slots in which the data is located. Another one of the methods includes arranging original feedback bits in the feedback codebook according to the order of the time slots in which the corresponding data is located, and newly added feedback bits are arranged according to the order of the time slots in which the corresponding data is located, the new feedback bits being arranged after the original feedback bits in the combined feedback codebook.

In some implementations, the method further includes determining whether the canceled feedback information is combined with the previous feedback information or combined with the subsequent feedback information based on base station configurations or based on predefined conditions (e.g., as described in the fifth implementation).

Accordingly, by combining the canceled feedback information with other feedback information to generate and transmit a combined feedback codebook, the canceled feedback information can be retransmitted to the base station, thus conserving the semi-static codebook feedback overhead and reducing the impact on the DL transmission resource inefficiency caused by the cancelation of the feedback information.

In some scenarios, UL control information (e.g., UCI) for low-priority services (such as but not limited to, services for Enhanced Mobile Broadband (eMBB)) is carried on a PUCCH. Transmission of high-priority service (such as but not limited to, services for ultra-reliable low-latency communication (URLLC)) can preempt, usurp, or otherwise take resources occupied by or allocated for the PUCCH, resulting in cancelation of the PUCCH. The UCI can no longer be transmitted due to the cancelation of the PUCCH.

In other scenarios, the UCI is carried on a PUSCH. FIG. 1 is a schematic diagram illustrating a scenario in which PUSCH is preempted, according to some examples. Referring to FIG. 1, a first scheduling request (SR) 112 is sent by a first UE 102 to a base station 101. The first SR 122 is a request for transmission resource for UL service for the first UE 102. The UL service corresponds to a low-priority service such as but not limited to, eMBB. An example of the base station 101 is a gNB. Through UL grant 114, the base station 101 allocates UL resource 116 (e.g., PUSCH) for the UL service transmission of the low-priority service for the first UE 102, responsive to the SR 112.

After the transmission of the SR 112 and the UL grant 114, a second UE 104 transmits a second SR 118. The second SR 118 corresponds to a high-priority service such as but not limited to, URLLC. Given that the second SR 118 is requesting transmission resource for UL service that has low-delay and high-reliability transmission requirements, the base station 101 allocates resources to the UE 104 as soon as possible. Through UL grant 120, the base station 101 allocates UL resource 122 for the UL service transmission of the high-priority service for the second UE 104, responsive to the SR 118. In some cases, the resource (e.g., the UL resource 122) that satisfy such transmission requirements may have already been allocated to the first UE 102. As shown, the UL resource 122 and the UL resource 116 collide (overlap in time). Given that the priority of the UL service of the second UE 104 is higher than the priority of the UL service of the first UE 102, the base station 101 cancels the transmission of the UL service of the first UE 102 on the previously allocated UL resource 116.

Various methods can be used to cancel the PUSCH transmission on the previously allocated UL resource 116. In one example, the base station 101 can re-schedule another PUSCH resource 124 for first UE 102 (through UL grant 126), and then cancels the transmission on the original allocated PUSCH UL resource 116. That is, the base station 101 can retransmit a UL grant (e.g., the UL grant 126) to the first UE 102, where the HARQ process ID for the UL grant 126 is the same as that of the UL grant 114. The new data indicator field (NDI) of the UL grant 126 is inverted with respect to the NDI of the UL grant 114, thus indicating that the UL grant corresponds to the previously allocated resource 116. The previously allocated resource 116 originally intended to be used for transmitting the UL transmission of the UE 102 is released to make room for the UL transmission of the UE 104. Rescheduling and canceling the previously allocated resource 116 can be performed for a portion of or the entirety of the previously allocated resource 116. That is, a portion of or an entirety of a transport block of the previously allocated resource 116 can be rescheduled to the new resource 124.

In another example, the base station 101 can notify the first UE 102 that the UL resource 116 has been preempted by the high-priority service transmission using cancellation indication signaling. Accordingly, the first UE 102 cancels the transmission on the preempted UL resource 116. The cancellation indication signaling can be carried in physical DL control information (DCI) or a specific signal sequence on the DL control channel.

In yet another example, the base station 101 instructs the first UE 102 to reduce transmission power to zero on a portion or the entirety of the UL resource 116, thus indirectly causing partial or complete cancelation of the UL resource 116.

The PUSCH resource (e.g., the UL resource 116) can carry UCI information, examples of which include HARQ-ACK feedback information, SR information, channel state information (CSI), and so on. In the scenario in which the PUCCH carrying the UCI overlaps with the PUSCH scheduled for the same UE in the time domain, the UCI information is carried in portion of the PUSCH resource. At this time, the UCI is independently coded with the PUSCH. The encoded UCI is mapped to a portion of the PUSCH resources determined according to predefined algorithms. Due to the fact that a portion of the PUSCH resource is occupied by the UCI, the PUSCH performs transmission based on puncturing or rate-matching, and mapped to remaining portions of the resource.

When the PUSCH or PUCCH is canceled as described herein, if the UCI is carried in the PUSCH or PUCCH (especially when the HARQ-ACK feedback information is carried in the PUSCH or PUCCH), the manner in which the HARQ-ACK feedback information is retransmitted is described in the present disclosure.

The PUSCH or PUCCH cancelation due to the collision with the high-priority service transmission as described herein is used as a non-limiting example in which the disclosed features can be applied, and the disclosed features can be likewise applied to PUSCH or PUCCH cancellation caused by other reasons. For example, the PUSCH or PUCCH resource can be canceled due to conflicts with a frame structure configuration, collision with other UL transmissions of the same UE or different UEs, power limitation of the UE, and so on.

In some cases, the semi-static codebook can be used for determining the HARQ-ACK codebook. For example, according to the UL feedback (e.g., DL data to UL feedback) timing set configured in radio resource control (RRC) signaling (which may be referred to as a K1 set), a set of DL time slots corresponding to an UL time slot can be determined. For the DL time slots, the UE provides feedback regardless of whether the base station has scheduled the DL data of the UE. Such codebook determination method ensures consistency between the base station and the UE with respect to the size of the codebook and the order of feedback bits within the codebook. Given that the semi-static codebook does not need to provide additionally indication for DL transmission in the DL scheduling DCI, so the DCI signaling is conserved. However, because some DL resources are not scheduled for the UE, feedback information corresponding to such DL resources is overhead with limited utility.

An UL slot can be used to provide feedback for corresponding DL data in DL slots. The DL slots corresponding to two UL slots can overlap. That is, two or more UL slots can provide feedback for DL data in a same DL slot. The DL slots located in an overlap region occupy feedback bits in the feedback codebooks of multiple UL slots. In addition, the actual K1 value in the DL control information scheduling the DL data in the DL slot can be used to determine (identify) the UL slot that contains the true feedback result, while the feedback NACK is provided in the other UL slots that are mapped to the DL slot.

Figure 2:
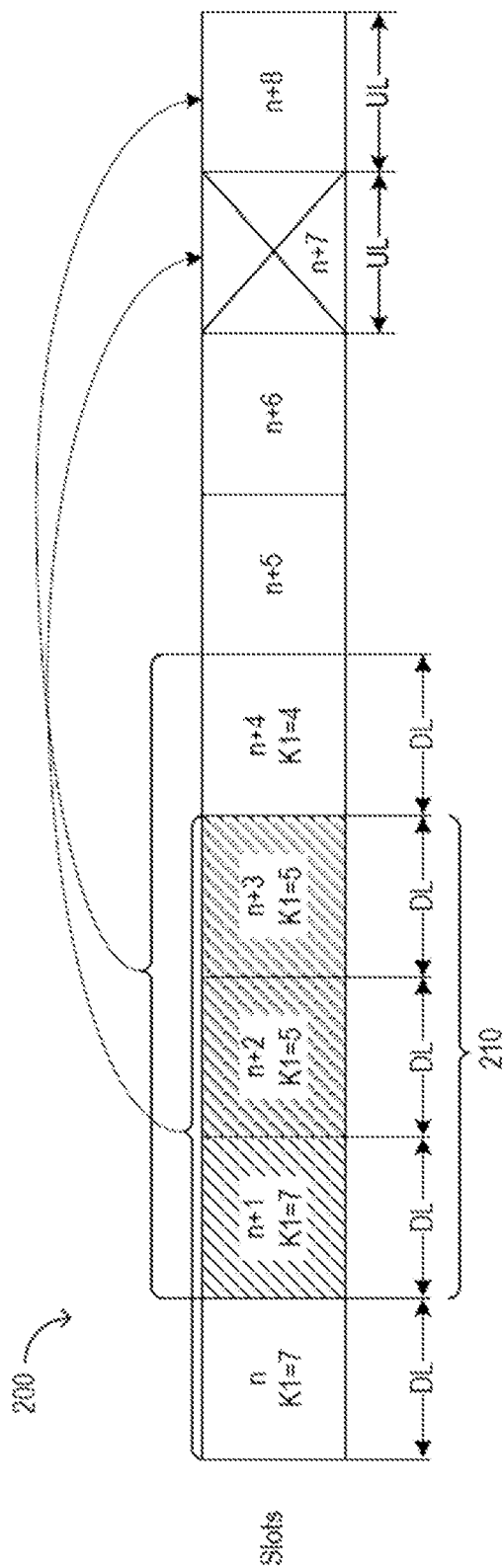
FIG. 2 is a schematic diagram illustrating a method for combining codebooks according to a first implementation.

FIG. 2 is a schematic diagram illustrating a method for combining codebooks according to a first implementation. Referring to FIGS. 1-2, FIG. 2 shows a time slot configuration 200 for a UE. K1 set for the time slot configuration 200 is configured to be {4, 5, 6, 7}. For example, UL slot n+7 is configured to include feedback information for DL data in DL slots n, n+1, n+2, n+3. The feedback information contained in UL slot n+7 forms a feedback codebook. UL slot n+8 is configured to include feedback information for DL data in DL slots n+1, n+2, n+3, n+4. The feedback information contained in UL slot n+8 forms another feedback codebook. According to the K1 set configurations, if a slot corresponding to the UL feedback slot is not a DL slot, then the UL feedback slot does not need to provide feedback for that slot. An overlap region 210 as shown in FIG. 2 includes DL slots n+1, n+2, and n+3. For a DL slot (e.g., DL slot n+1) in the overlap region 210, if the K1 value indicated in the DL scheduling DCI for scheduling the DL data is 7, the feedback or the true result of receiving the data in the DL slot (e.g., the DL slot n+1) will be reported in slot (n+1)+7, which is UL slot n+8.

In some examples, in response to determining that the UE has successfully received the DL data in a DL slot (e.g., DL slot n+1), the feedback bit corresponding to DL slot n+1 that is contained in UL slot n+8 is set to 1. The feedback bit corresponding to DL slot n+1 that is contained in another UL slot (e.g., slot n+7) mapped to DL slot n+1 is set to 0.

In an example in which a base station schedules DL data in DL slot n+1, the UE may successfully receive the DL scheduling DCI for the DL data scheduled for DL slot n+1 but does not successfully receive the DL data in DL slot n+1. In this example, both of the feedback bits in UL slot n+7 and in UL slot n+8 that correspond to DL slot n+1 are set to zero.

In another example in which a base station schedules DL data in DL slot n+1, the UE does not successfully receive the DL scheduling DCI for the DL data scheduled for DL slot n+1. In this example, both of the feedback bits in UL slot n+7 and in UL slot n+8 that correspond to DL slot n+1 are set to zero.

In another example in which the base station does not schedule any DL data in DL slot n+1, both of the feedback bits in UL slot n+7 and in UL slot n+8 that correspond to DL slot n+1 are set to zero.

The example shown in FIG. 2 assumes that DL data is scheduled on DL slots n+1, n+2, n+3, and n+4, and the UE correctly receives the DL data in DL slots n+1, n+2, n+3, and n+4. According to K1 values shown in FIG. 2, the HARQ-ACK feedback codebook in UL slot n+7 is "1010," and the HARQ-ACK feedback codebook in UL slot n+8 is "1011."

In the scenario in which HARQ-ACK feedback information (e.g., the feedback bits "1010" in UL slot n+7) is canceled given that the UL resource in UL slot n+7 is allocated for another purpose, the HARQ-ACK feedback information can be combined with HARQ-ACK feedback information scheduled to be subsequently transmitted (e.g., the HARQ-ACK feedback information in UL slot n+8) into a combined feedback codebook to provide feedback. The combined feedback codebook (e.g., combined feedback information) is transmitted using the UL resource in UL slot n+8.

In some implementations, bit cascading can be used to form the combined feedback codebook, e.g., bit cascading can be performed directly on a previous feedback codebook to form the new combined codebook. In FIG. 2, as an example, the feedback codebook in the UL slot n+7 is "1010," and the feedback codebook in UL slot n+8 is "1011." The feedback resource for UL slot n+7 is usurped or preempted in any suitable manner (denoted as such using "X"). As such, the feedback information contained in UL slot n+7 is canceled. The feedback information (the feedback codebook) of UL slot n+7 is bit-cascaded with the feedback information (the feedback codebook) of UL slot n+8. The combined feedback codebook in UL slot n+8 is "10101011." Bit cascading can introduce redundant bits (e.g., repeated bits for DL transmissions in the overlap region 210).

In alternative arrangements, the redundant bits can be removed. As shown in Table 1, for each of the DL slots n+1, n+2, and n+3 that correspond to the two UL feedback slots n+7 and n+8 and are in the overlap region 210, the corresponding original feedback bit on UL slot n+7 and the corresponding original feedback bit on UL slot n+8 are combined using an "OR" operation to determine the feedback bit corresponding to each of the DL slots n+1, n+2, and n+3 in the combined HARQ-ACK feedback codebook (e.g., the combined feedback information). For example, for DL slot n+1, the original feedback bit in UL slot n+7 is "0," and the original feedback bit in UL slot n+8 is "1." The feedback bit in the combined feedback codebook that corresponds to DL slot n+1 is 1 ("0" OR "1"). Similarly, for DL slot n+2, the original feedback bit in UL slot n+7 is "1," and the original feedback bit in UL slot n+8 is "0." The feedback bit in the combined feedback codebook that corresponds to DL slot n+2 is 1 ("1" OR "0"). For DL slot n+3, the original feedback bit in UL slot n+7 is "0," and the original feedback bit in UL slot n+8 is "1." The feedback bit in the combined feedback codebook that corresponds to DL slot n+3 is 1 ("0" OR "1"). The feedback bits (e.g., the feedback bit "1" for DL slot n and the feedback bit "1" for DL slot n+4) corresponding to DL slots not in the overlapping region 210 are added to the combined feedback codebook. Accordingly, the combined (HARQ-ACK) feedback information transmitted to the base station in UL slot n+8 includes the combined feedback codebook "11111." The feedback bits in the combined feedback codebook has an order corresponding to that of the DL slots n, n+1, n+2, n+3, and n+4. As such, the redundant bits can be removed given that the combined feedback codebook in UL slot n+8 is shortened from "10101011" to "11111." As compared to bit cascading, performing "OR" operations reduces feedback codebook overhead as much as possible while not losing feedback information by providing one bit for each DL slot, and thus improves feedback efficiency.

TABLE 1

| slot | n | n + 1 | n + 2 | n + 3 | n + 4 |
|---|---|---|---|---|---|
| Original feedback information in slot n + 7 | 1 | 0 | 1 | 0 | — |
| Original feedback information in slot n + 8 | — | 1 | 0 | 1 | 1 |
| Combined feedback information in slot n + 8 | 1 | 1 | 1 | 1 | 1 |

In some examples, the order of the feedback bits in the combined 5-bit feedback information (combined feedback codebook) can be one where feedback bit(s) corresponding to DL slot(s) (e.g., DL slot n) that is associated with UL slot n+7 but not associated with UL slot n+8 (referred to as newly added feedback bits) is at an end of the combined feedback codebook, after the feedback bits corresponding to DL slots (e.g., DL slots n+1, n+2, n+3, and n+4) originally associated with UL slot n+8. That is, the feedback bits in the combined feedback codebook are arranged sequentially in this order: feedback bit for DL slot n+1, feedback bit for DL slot n+2, feedback bit for DL slot n+3, feedback bit for DL slot n+4, and feedback bit for DL slot n. Other ordering protocols can be implemented. The manner in which the feedback bits in the combined feedback codebook are ordered can be reflected in the communication protocol between the UE and the base station, such that the base station can map the feedback bits in the combined feedback codebook to each of the DL slots corresponding to a respective one of those feedback bits.

In some examples, given that the feedback information originally to be carried in UL slot n+7 is merged with the feedback information originally to be carried in UL slot n+8, the size of the combined feedback codebook becomes (X+Z) bits. X is a number of bits of the feedback codebook originally carried by UL slot n+8. Z is a number of bits needed to provide feedback for DL slots associated with UL slot n+7 but not UL slot n+8. N is a non-negative integer. In an example in which carrier aggregation or code block group (CBG) transmission is configured, Z can be related to one or more of a number of component carriers, CBG configuration, number of codewords, and so on.

Figure 3:
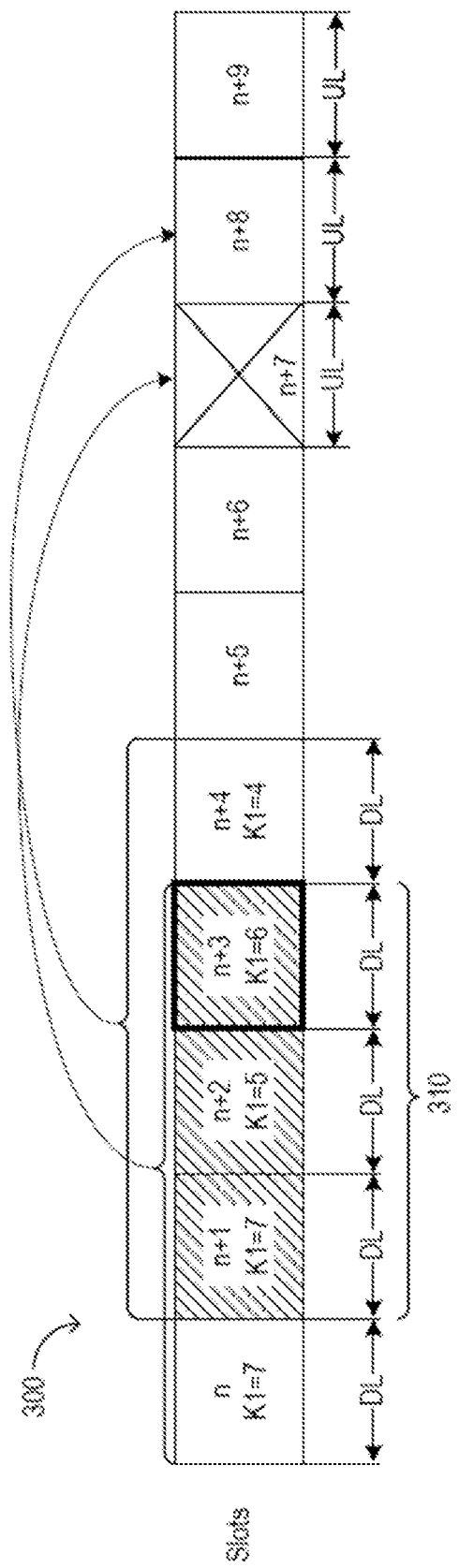
FIG. 3 is a schematic diagram illustrating a method for combining codebooks according to a second implementation.

FIG. 3 is a schematic diagram illustrating a method for combining codebooks according to a second implementation. Referring to FIGS. 1-3, FIG. 3 shows a time slot configuration 300 for a UE. K1 set for the time slot configuration 300 is configured to be {4, 5, 6, 7}. For example, UL slot n+7 is configured to include feedback information for DL data in DL slots n, n+1, n+2, n+3. The feedback information contained in UL slot n+7 forms a feedback codebook. UL slot n+8 is configured to include feedback information for DL data in DL slots n+1, n+2, n+3, n+4. The feedback information contained in UL slot n+8 forms another feedback codebook. The example shown in FIG. 3 assumes that DL data is scheduled on DL slots n+1, n+2, n+3, and n+4, and the UE correctly receives the DL data in DL slots n+1, n+2, n+3, and n+4. In FIG. 3, as an example, the original feedback codebook in the UL slot n+7 is "1010," and the original feedback codebook in UL slot n+8 is "1001." The feedback resource for UL slot n+7 is usurped or preempted in any suitable manner (denoted as such using "X"). As such, the feedback information contained in UL slot n+7 is canceled. An overlap region 310 as shown in FIG. 3 includes DL slots n+1, n+2, and n+3, e.g., DL slots n+1, n+2, and n+3 correspond to both UL slots n+7 and n+8.

The feedback information originally to be include in UL slot n+7 can be combined with the feedback information originally to be include in UL slot n+8 to form combined feedback information to be transmitted to the base station in UL slot n+8. For example, associated DL slots (e.g., one or more of the DL slots n+1, n+2, and n+3) in the overlap region 310 that point to UL slot n+7 or slot n+8 (and not to another UL slot) can determined according to K1 value in the DCI. The DL reception status of those associated DL slots can be provided in the combined feedback codebook (to be transmitted in UL slot n+8), where feedback bits corresponding to those associated DL slots in the combined feedback codebook are determined based on whether the DL data has been correctly received in those associated DL slots. UL slot n+7 can be understood as the UL slot containing canceled feedback information. UL slot n+8 can be understood as the UL slot containing retransmitted feedback information. For any one of DL slots in the overlap region 310 that does not point to UL slot n+7 or UL slot n+8 (according to the K1 values in the DCI) and instead to another UL slot, the corresponding feedback bit in the combined feedback codebook is "0." A DL slot having a corresponding feedback bit of "0" indicates NACK.

For example, in FIG. 3, the UE correctly receives DL data in DL slot n+1. Based on the K1 value of 7 as indicated in the DCI, the DL slot n+1 corresponds to UL slot n+8. In generated the combined feedback codebook in UL slot n+8, the feedback bit corresponding to DL slot n+1 is determined based on the actual status of data reception in DL slot n+1. Given that the UE correctly receives DL data in DL slot n+1, the feedback bit corresponding to DL slot n+1 is 1. With regard to DL slot n+2, based on the K1 value of 5 as indicated in the DCI, the DL slot n+2 corresponds to UL slot n+7. In generated the combined feedback codebook in UL slot n+8, the feedback bit corresponding to DL slot n+2 is determined based on the actual status of data reception in DL slot n+2. If the UE correctly receives DL data in DL slot n+2, the feedback bit corresponding to DL slot n+2 is also 1.

With regard to DL slot n+3, the K1 value of 6 as indicated in the DCI means that DL slot n+3 is associated with UL slot n+9 and not with UL slot n+7 or UL slot n+8). In response to determining that DL slot n+3 is associated with neither UL slot n+7 nor UL slot n+8, the feedback bit corresponding to DL slot n+3 in the combined feedback codebook to be transmitted in UL slot n+8 is "0" (e.g., feeding back NACK). The feedback bits (e.g., the feedback bit "1" for DL slot n and the feedback bit "1" for DL slot n+4) corresponding to DL slots not in the overlapping region 310 are added to the combined feedback codebook. As such, the combined feedback codebook to be transmitted in UL slot n+8 is "11101." Each feedback bit in the combined feedback codebook "11101" provides feedback for DL slots n, n+1, n+2, n+3, and n+4, in that order.

In some examples, the order of the feedback bits in the combined 5-bit feedback information (combined feedback codebook) can be one where feedback bit(s) corresponding to DL slot(s) (e.g., DL slot n) that is associated with UL slot n+7 but not associated with UL slot n+8 (referred to as newly added feedback bits) is at an end of the combined feedback codebook, after the feedback bits corresponding to DL slots (e.g., DL slots n+1, n+2, n+3, and n+4) originally associated with UL slot n+8. That is, the feedback bits in the combined feedback codebook are arranged sequentially in this order: feedback bit for DL slot n+1, feedback bit for DL slot n+2, feedback bit for DL slot n+3, feedback bit for DL slot n+4, and feedback bit for DL slot n. Other ordering protocols can be implemented. The manner in which the feedback bits in the combined feedback codebook are ordered can be reflected in the communication protocol between the UE and the base station, such that the base station can map the feedback bits in the combined feedback codebook to each of the DL slots corresponding to a respective one of those feedback bits.

In some examples, given that the feedback information originally to be carried in UL slot n+7 is merged with the feedback information originally to be carried in UL slot n+8, the size of the combined feedback codebook becomes (X+Z) bits. X is a number of bits of the feedback codebook originally carried by UL slot n+8. Z is a number of bits needed to provide feedback for DL slots associated with UL slot n+7 but not UL slot n+8. Z is a non-negative integer. In an example in which carrier aggregation or CBG transmission is configured, N can be related to one or more of a number of component carriers, CBG configuration, number of codewords, and so on.

Figure 4:
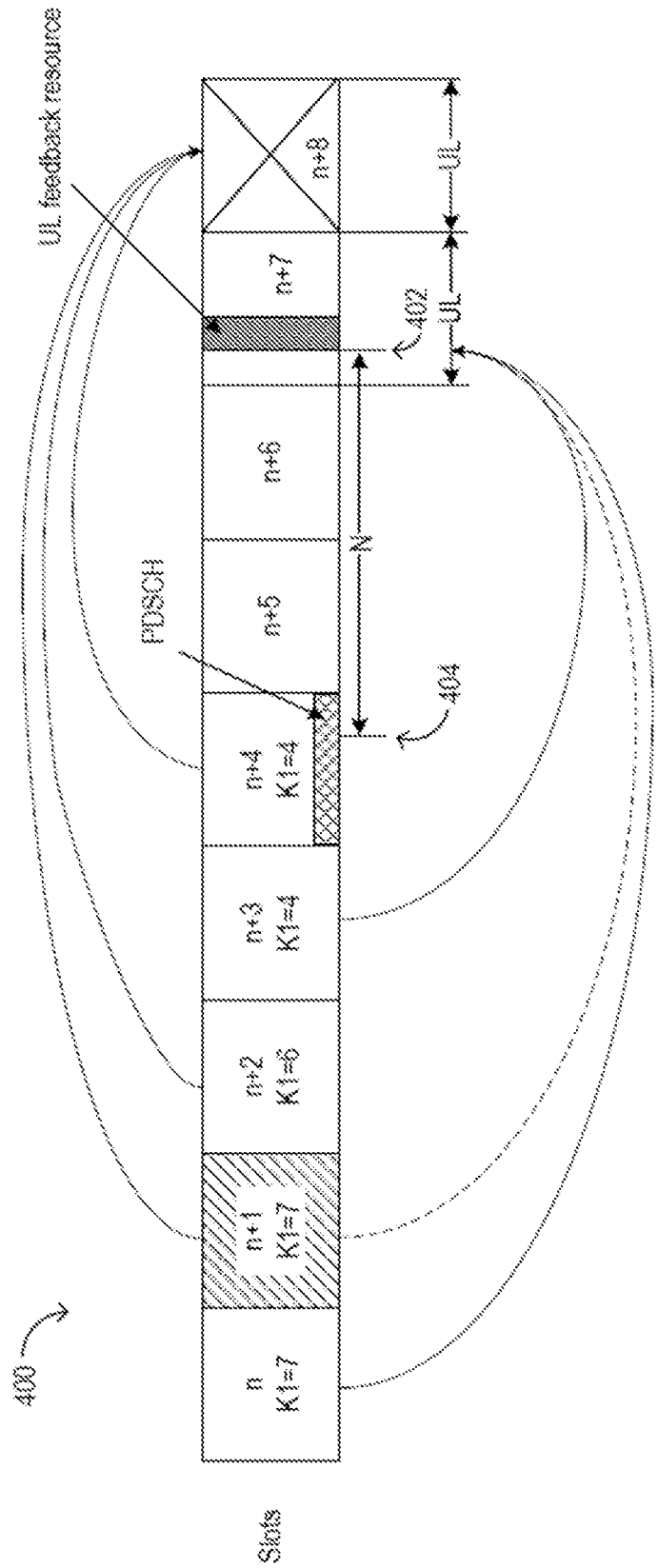
FIG. 4 is a schematic diagram illustrating a method of combining codebooks according to a third implementation.

FIG. 4 is a schematic diagram illustrating a method of combining codebooks according to a third implementation. Referring to FIGS. 1-4, FIG. 4 shows a time slot configuration 400 for a UE. K1 set for the time slot configuration 400 is configured to be {4, 6, 7}. For example, UL slot n+7 is configured to include feedback information for DL data in DL slots n, n+1, and n+3. The feedback information contained in UL slot n+7 forms a feedback codebook. UL slot n+8 is configured to include feedback information for DL data in DL slots n+1, n+2, and n+4. The feedback information contained in UL slot n+8 forms another feedback codebook. As shown in FIG. 4, solid arrows represent actual feedback associations between DL slots and UL slots as determined based on K1 values contained in the DCI. Dotted arrows represent feedback relationships contained in K1 set of the RRC configuration, where such feedback relationships are not indicated by the K1 values in the DCI. For example, DL slot n+1 corresponds to both UL slots n+7 and n+8, respectively. DL slot n+1 is an overlap slot in an overlap region for UL slots n+7 and n+8. According to K1 value configured in the DCI, UE provides feedback for the reception status of DL data scheduled in DL slot n+1 in UL slot n+7. The feedback bit corresponding to DL slot n+1 in UL slot n+8 is set to 0 (feedback is NACK). The example shown in FIG. 4 assumes that DL data is scheduled on DL slots n, n+1, n+2, n+3, and n+4, and the UE correctly receives the DL data in DL slots n, n+1, n+2, n+3, and n+4.

In FIG. 4, as an example, the original feedback codebook in the UL slot n+7 is "101," and the original feedback codebook in UL slot n+8 is "111." The feedback resource for UL slot n+8 is usurped or preempted in any suitable manner (denoted as such using "X"). As such, the feedback information contained in UL slot n+8 is canceled. The feedback information originally to be include in UL slot n+8 can be combined with the feedback information originally to be include in UL slot n+7 to form combined feedback information to be transmitted to the base station in UL slot n+7. UL slot n+7 is a time slot that occurs earlier in time than UL slot n+8, therefore, UL slot n+7 is a previous resource or slot, and UL slot n+8 is a subsequent resource or slot.

In some examples, feedback bits providing feedback for DL data received in slots (e.g., DL slot n+1) in the overlap region that correspond to UL slots n+7 and n+8 can be determined using the first implementation (described with respect to FIG. 1) or the second implementation (described with respect to FIG. 2).

DL slots that are only associated with UL slot n+8 in FIG. 4 are DL slots n+2 and n+4. Given that relevant feedback information is transmitted in UL slot n+7 in advance (before UL slot n+8, which has been usurped), feedback information originally to be carried in UL slot n+8 may not be transmitted in UL slot n+7 because the UE may not have completed Physical Downlink Shared Channel (PDSCH) processing. As such, feedback bits relating to DL slots that are only associated with UL slot n+8 to be carried by UL slot n+7 are determined according to processing capability of the UE.

A time threshold N can be defined, such that a time boundary 404 is defined as N symbols before a start symbol 402 of UL feedback resource in UL slot n+7. The value of feedback bit for DL data for which transmission is completed before the time boundary 404 (e.g., PDSCH end symbol for the DL data is before the time boundary 404, or is on or aligned with the time boundary 404) is determined based on actual reception status of the DL data.

With respect to DL data for which transmission is after the time boundary 404 (e.g., PDSCH end symbol for the DL data is later than the time boundary 404), NACK is provided as feedback. That is, feedback bit in the combined feedback codebook that corresponds to such DL data is "0."

For instance, time needed for PDSCH decoding and feedback information generation by the UE can be defined as the time threshold N. N can be predefined in the communication protocol, can be configured by the base station, or can be determined by the UE according to the processing capability of the UE. In the example in which N is determined by the UE according to the processing capability of the UE, better processing capability (shorter processing time) corresponds to lesser value of N. For DL data in DL slot n+4, in response to determining that a time interval between the PDSCH end symbol and the feedback resource start symbol is less than N, the UE is deemed to lack the capability to complete the PDSCH decoding and the feedback information generation before the uplink feedback resource start symbol in UL slot n+7. Therefore, the UE cannot provide feedback for such DL data in slot n+7. As such, in UL slot n+7, the feedback bit corresponding to DL data in DL slot n+4 is set to "0" (NACK). Feedback bit in the combined codebook corresponding to the DL data in DL slot n+2 is determined according to actual reception status of the DL data.

As shown in Table 2, "-" indicates that no feedback information for DL data in a corresponding DL slot is included in the original feedback codebook. The combined feedback information in UL slot n+7 is "11110." The feedback bits in the combined feedback codebook has an order corresponding to that of the DL slots n, n+1, n+2, n+3, and n+4.

TABLE 2

| PDSCH processing completes before slot n + 7 feedback resource? | Yes | | | | No |
|---|---|---|---|---|---|
| slot | n | n + 1 | n + 2 | n + 3 | n + 4 |
| Original feedback information in slot n + 7 | 1 | 0 | — | 1 | — |
| Original feedback information in slot n + 8 | — | 1 | 1 | — | 1 |
| Combined feedback information in slot n + 7 | 1 | 1 | 1 | 1 | 0 |

In some examples, the order of the feedback bits in the combined 5-bit feedback information (combined feedback codebook) can be one where newly added feedback bit(s) corresponding to canceled feedback information is at an end of the combined feedback codebook, after the originally feedback bits of UL slot n+7. That is, the feedback bits in the combined feedback codebook are arranged sequentially in this order: feedback bit for DL slot n, feedback bit for DL slot n+1, feedback bit for DL slot n+3, feedback bit for DL slot n+2, and feedback bit for DL slot n+4. Other ordering protocols can be implemented. The manner in which the feedback bits in the combined feedback codebook are ordered can be reflected in the communication protocol between the UE and the base station, such that the base station can map the feedback bits in the combined feedback codebook to each of the DL slots corresponding to a respective one of those feedback bits.

In some examples, given that the feedback information originally to be carried in UL slot n+8 is merged with the feedback information originally to be carried in UL slot n+7, the size of the combined feedback codebook becomes (X+Y) bits. X is a number of bits of the feedback codebook originally carried by UL slot n+7. Y is a number of bits needed to provide feedback for DL slots associated with UL slot n+8 but not UL slot n+7. Y is a non-negative integer. In an example in which carrier aggregation or CBG transmission is configured, Y can be related to one or more of a number of component carriers, CBG configuration, number of codewords, and so on.

A fourth implementation relates to the third implementation described with reference to FIG. 4. In the scenario described in the third implementation, for DL data for which processing cannot be completed before feedback (e.g., the time interval between the PDSCH end symbol and the uplink feedback resource start symbol is less than the time threshold N), the feedback NACK is transmitted by the UE, occupying bit overhead in the feedback codebook. On the other hand, in the fourth implementation, instead of reporting a NACK for the DL data for which processing cannot be completed before feedback and occupying a feedback bit, no feedback is provided for the DL data in DL slot n+4 in UL slot n+7. As such, the feedback codebook in UL slot n+7 is "1111," which includes the feedback information for DL data in the DL slots n, n+1, n+2, and n+3. In other words, the "0" in "11110" corresponding to the DL data for which processing cannot be completed before feedback is omitted. The order of the feedback bits in the codebook corresponds to the order of the DL slots n, n+1, n+2, and n+3.

In some examples, the order of the feedback bits in the combined 4-bit feedback information (combined feedback codebook) can be one where newly added feedback bits feedback bit(s) corresponding to canceled feedback information is at an end of the combined feedback codebook, after the originally feedback bits of UL slot n+7. That is, the feedback bits in the combined feedback codebook are arranged sequentially in this order: feedback bit for DL slot n, feedback bit for DL slot n+1, feedback bit for DL slot n+3, and feedback bit for DL slot n+2. Other ordering protocols can be implemented. The manner in which the feedback bits in the combined feedback codebook are ordered can be reflected in the communication protocol between the UE and the base station, such that the base station can map the feedback bits in the combined feedback codebook to each of the DL slots corresponding to a respective one of those feedback bits.

Using the fourth implementation, the base station can likewise determine downlink data of a canceled feedback codebook that cannot be merged into a previous feedback codebook in a previous UL slot (e.g., UL slot n+7) according to processing capability of the UE, thus also determining the size of the feedback codebook in the previous UL slot.

The first implementation (described with reference to FIG. 2) and the second implementation (described with reference to FIG. 3) relate to the scenario in which canceled feedback information is combined with the feedback information into one codebook to be transmitted in UL resource subsequent in time with respect to UL resource in which the canceled feedback information was to be transmitted before cancelation (referred to as "backward combination"). The third and fourth implementations (described with reference to FIG. 4) relate to the scenario in which canceled feedback information is combined with the feedback information into one codebook to be transmitted in UL resource prior in time with respect to UL resource in which the canceled feedback information was to be transmitted before cancelation (referred to as "forward combination"). In a fifth implementation, to transmit the canceled feedback information, the UE can determine whether to select forward combination or backward combination according to one or more predefined conditions. In some arrangements, the UE can select one of forward combination and backward combination that conserves feedback bits more (that has the least feedback overhead).

In one example, the canceled UL feedback information was to be transmitted in a first UL slot before cancelation, the first UL slot corresponds to (can provide feedback for) a first set of DL slots, a second UL slot prior to the first UL slot corresponds to (can provide feedback for) a second set of DL slots, and a third UL slot subsequent to the first UL slot corresponds to (can provide feedback for) a third set of DL slots. In response to determining that the first set of DL slots overlaps with more DL slots in the second set of DL slots than the third set of DL slots, forward combination is selected, and the canceled feedback information is transmitted using the second UL slot. On the other hand, in response to determining that the first set of DL slots overlaps with more DL slots in the third set of DL slots than the second set of DL slots, backward combination is selected, and the canceled feedback information is transmitted using the third UL slot.

In another example, in response to determining that the UE has the capability to complete the PDSCH decoding and the feedback information generation in time (e.g., the PDSCH decoding and the feedback information generation can be completed before the uplink feedback resource start symbol a prior UL slot as described with reference to the third implementation), forward combination with the prior UL slot is selected. On the other hand, in response to determining that the UE lacks the capability to complete the PDSCH decoding and the feedback information generation in time (e.g., the PDSCH decoding and the feedback information generation cannot be completed before the uplink feedback resource start symbol the prior UL slot as described with reference to the third implementation), backward combination with a subsequent UL slot is selected.

Other predefined conditions can be implemented.

In other examples, the base station configures the UE to select one of forward combination or backward combination by sending configuration signals or messages via RRC signaling or physical layer signaling. The UE can select forward combination or backward combination according to what is indicated in the signals or messages received from the base station.

Figure 5:
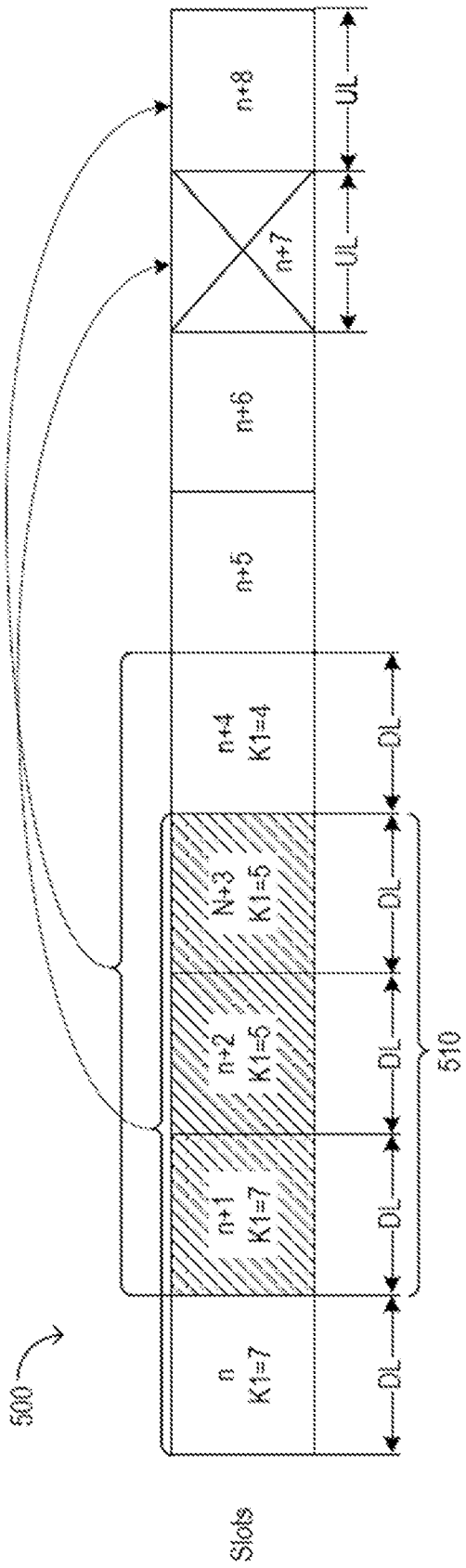
FIG. 5 is a schematic diagram illustrating a method for combining codebooks according to a sixth implementation.

FIG. 5 is a schematic diagram illustrating a method for combining codebooks according to a sixth implementation. Referring to FIGS. 1-5, FIG. 5 shows a time slot configuration 500 for a UE. K1 set for the time slot configuration 500 is configured to be {4, 5, 6, 7}. For example, UL slot n+7 is configured to include feedback information for DL data in DL slots n, n+1, n+2, n+3. The feedback information contained in UL slot n+7 forms a feedback codebook. UL slot n+8 is configured to include feedback information for DL data in DL slots n+1, n+2, n+3, n+4. The feedback information contained in UL slot n+8 forms another feedback codebook. An overlap region 510 as shown in FIG. 5 includes DL slots n+1, n+2, and n+3. The example shown in FIG. 5 assumes that DL data is scheduled on DL slots n+1, n+2, n+3, and n+4, and the UE correctly receives the DL data in DL slots n+1, n+2, n+3, and n+4. According to K1 values shown in FIG. 5, the HARQ-ACK feedback codebook in UL slot n+7 is "1010," and the HARQ-ACK feedback codebook in UL slot n+8 is "1011." The feedback bit in the combined feedback codebook corresponding to DL slots n+1, n+2, and n+3 in the overlap region 510 can be determined using the first implementation or the second implementation.

In some examples, no feedback information is provided for DL data in DL slot n, which corresponds to only UL slot n+7 and not UL slot n+8. As such, the HARQ-ACK codebook (e.g., the feedback information) transmitted in UL slot n+8 is "1111" which corresponds to DL slots n+1, n+2, n+3, and n+4, in that order. The feedback for DL slot n+2 (in the overlap region 510) is "1" (see the first implementation).

Given that feedback for DL data in DL slot corresponding to the canceled feedback information (and UL slot n+7) and not to UL slot n+8 is omitted, the combined feedback codebook generated in this manner adds canceled feedback information (with respect to DL in the overlap region 510) while maintaining the size of the feedback codebook in the original UL slot (UL slot n+8) and the definition of bit order in the feedback codebook in the original UL slot.

Figure 6:
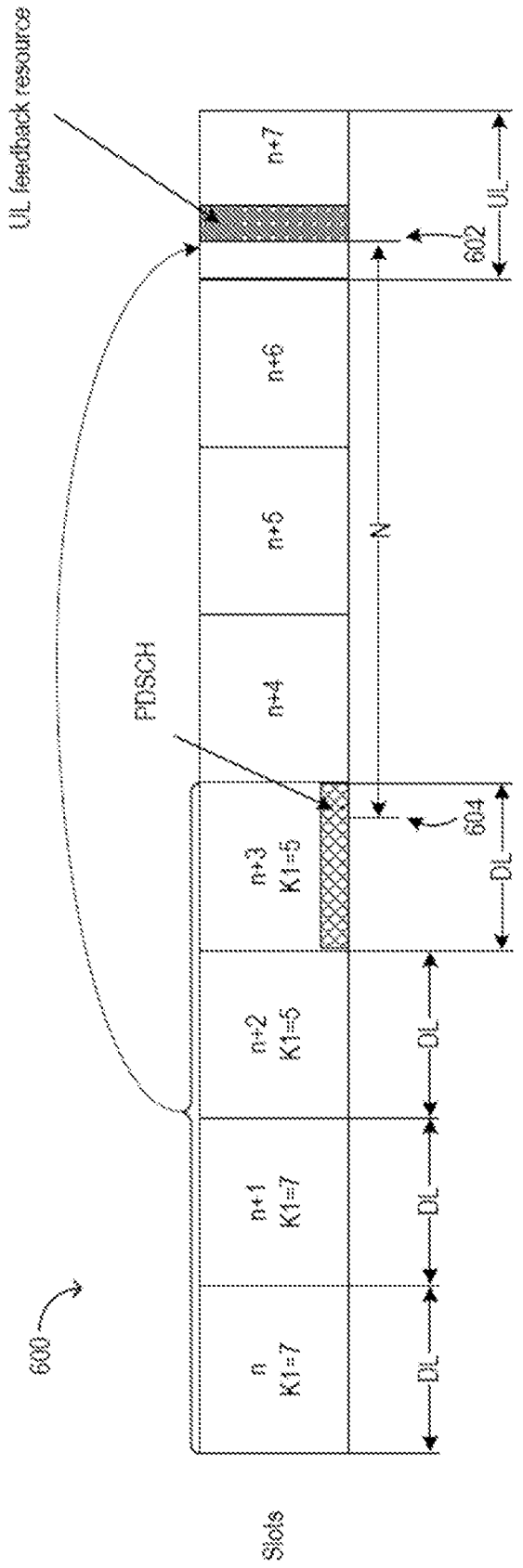
FIG. 6 is a schematic diagram illustrating a method for generating a semi-static codebook according to the seventh implementation.

FIG. 6 is a schematic diagram illustrating a method for generating a semi-static codebook according to the seventh implementation. Referring to FIGS. 1-6, FIG. 6 shows a time slot configuration 600 for a UE. K1 set for the time slot configuration 600 is configured to be {4, 5, 6, 7}. For example, UL slot n+7 is configured to include feedback information for DL data in DL slots n, n+1, n+2, n+3. The feedback information contained in UL slot n+7 forms a (semi-static) feedback codebook. The example shown in FIG. 6 assumes that DL data is scheduled on DL slots n+1, n+2, n+3, and n+4, and the UE correctly receives the DL data in DL slots n+1, n+2, n+3, and n+4.

As the semi-static codebook is generated, a value for each feedback information bit in the semi-static feedback codebook is determined according to the processing capability of the UE. N symbols before an UL slot n+7 UL feedback resource start symbol 602 is defined as a time boundary 604. For instance, time needed for PDSCH decoding and feedback information generation by the UE can be defined as the time threshold N. N can be predefined in the communication protocol, can be configured by the base station, or can be determined by the UE according to the processing capability of the UE. In the example in which N is determined by the UE according to the processing capability of the UE, better processing capability (shorter processing time) corresponds to lesser value of N.

Feedback bit for DL data for which transmission is completed before the time boundary 604 (e.g., PDSCH end symbol for the DL data is before the time boundary 604, or is on or aligned with the time boundary 604) is determined based on actual reception status of the DL data (whether the DL data has been correctly received), regardless of whether the K1 value in the DCI for the DL data indicates UL slot n+7. With respect to DL data for which transmission cannot be completed before the time boundary 604 (e.g., PDSCH end symbol for the DL data is later than the time boundary 604), NACK is provided as feedback. That is, feedback bit in the combined feedback codebook that corresponds to such DL data is "0."

As shown in FIG. 6, according to the K1 set configuration, UL slot n+7 includes feedback information for DL data carried in DL slots n, n+1, n+2, and n+3. According to the processing capability of the UE, the DL data in DL slot n+3 cannot be processed (PDSCH decoding and feedback information generation) before UL feedback. Therefore, NACK is provided as the feedback for the DL data in DL slot n+3. That is, feedback bit in the combined feedback codebook that corresponds to such DL data is "0."

For DL slot n, n+1, and n+2, the UE determines the values of the feedback bits in the HARQ-ACK feedback codebook according to whether the DL data has been correctly received. Assuming that DL data in all of DL slots n, n+1, and n+2 have been correctly received, the feedback codebook to be transmitted in UL n+7 is "1110."

The feedback for the DL data in DL slot n+3 can be included in or combined with feedback information transmitted in a UL slot subsequent to UL slot n+7. At this time, the base station can determine that the feedback information for DL slot n+3 contained in UL slot n+7 is not the true feedback information, according to the processing capability of the UE. As a result, the base station can determine that the true feedback information for the DL data will be in a subsequent UL slot or combined with subsequent feedback information.

In this semi-static codebook generation mode, even if the transmission of a certain feedback information is canceled due to the preemption of resources, the neighboring feedback resources can be used to send lost feedback information to the base station, thus reducing the impact of feedback resource preemption.

Figure 7A:
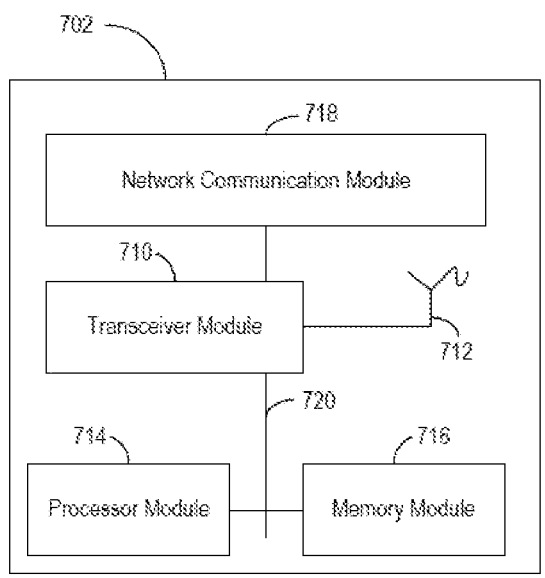
FIG. 7A illustrates a block diagram of an example base station, in accordance with some embodiments of the present disclosure.
Figure 7B:
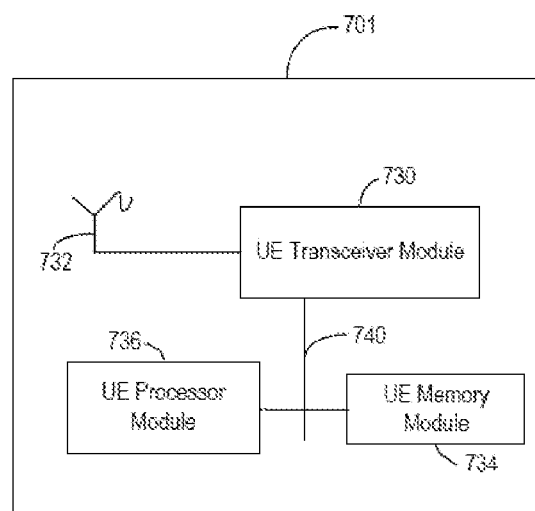
FIG. 7B illustrates a block diagram of an example UE, in accordance with some embodiments of the present disclosure.

FIG. 7A illustrates a block diagram of an example base station 702, in accordance with some embodiments of the present disclosure. FIG. 7B illustrates a block diagram of an example UE 701, in accordance with some embodiments of the present disclosure. Referring to FIGS. 1-7B, the UE 701 (or wireless communication device) is an example implementation of the UEs described herein, and the base station 702 is an example implementation of the base station described herein.

The base station 702 and the UE 701 can include components and elements configured to support known or conventional operating features that need not be described in detail herein. In one illustrative embodiment, the base station 702 and the UE 701 can be used to communicate (e.g., transmit and receive) data symbols in a wireless communication environment such as the network system architecture 100 and the slice deployment 200, as described above. For instance, the base station 702 can be a base station (e.g., gNodeBs (gNBs), and so on), a server, a node, or any suitable computing device used to implement the NFs (e.g., the AMF 102, the SMF 106, the UPF 108, the UDM 112, the PCF 114, the AF 116, and so on) and to provide the networks 104, 110, and 202.

The base station 702 includes a transceiver module 710, an antenna 712, a processor module 714, a memory module 716, and a network communication module 718. The module 710, 712, 714, 716, and 718 are operatively coupled to and interconnected with one another via a data communication bus 720. The UE 701 includes a UE transceiver module 730, a UE antenna 732, a UE memory module 734, and a UE processor module 736. The modules 730, 732, 734, and 736 are operatively coupled to and interconnected with one another via a data communication bus 740. The base station 702 communicates with the UE 701 or another base station via a communication channel, which can be any wireless channel or other medium suitable for transmission of data as described herein.

As would be understood by persons of ordinary skill in the art, the base station 702 and the UE 701 can further include any number of modules other than the modules shown in FIGS. 7A and 7B. The various illustrative blocks, modules, circuits, and processing logic described in connection with the embodiments disclosed herein can be implemented in hardware, computer-readable software, firmware, or any practical combination thereof. To illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. The embodiments described herein can be implemented in a suitable manner for each particular application, but any implementation decisions should not be interpreted as limiting the scope of the present disclosure.

In accordance with some embodiments, the UE transceiver 730 includes a radio frequency (RF) transmitter and a RF receiver each including circuitry that is coupled to the antenna 732. A duplex switch (not shown) may alternatively couple the RF transmitter or receiver to the antenna in time duplex fashion. Similarly, in accordance with some embodiments, the transceiver 710 includes an RF transmitter and a RF receiver each having circuitry that is coupled to the antenna 712 or the antenna of another base station. A duplex switch may alternatively couple the RF transmitter or receiver to the antenna 712 in time duplex fashion. The operations of the two transceiver modules 710 and 730 can be coordinated in time such that the receiver circuitry is coupled to the antenna 732 for reception of transmissions over a wireless transmission link at the same time that the transmitter is coupled to the antenna 712. In some embodiments, there is close time synchronization with a minimal guard time between changes in duplex direction.

The UE transceiver 730 and the transceiver 710 are configured to communicate via the wireless data communication link, and cooperate with a suitably configured RF antenna arrangement 712/732 that can support a particular wireless communication protocol and modulation scheme. In some illustrative embodiments, the UE transceiver 710 and the transceiver 710 are configured to support industry standards such as the Long Term Evolution (LTE) and emerging 5G standards, and the like. It is understood, however, that the present disclosure is not necessarily limited in application to a particular standard and associated protocols. Rather, the UE transceiver 730 and the base station transceiver 710 may be configured to support alternate, or additional, wireless data communication protocols, including future standards or variations thereof.

The transceiver 710 and the transceiver of another base station (such as but not limited to, the transceiver 710) are configured to communicate via a wireless data communication link, and cooperate with a suitably configured RF antenna arrangement that can support a particular wireless communication protocol and modulation scheme. In some illustrative embodiments, the transceiver 710 and the transceiver of another base station are configured to support industry standards such as the LTE and emerging 5G standards, and the like. It is understood, however, that the present disclosure is not necessarily limited in application to a particular standard and associated protocols. Rather, the transceiver 710 and the transceiver of another base station may be configured to support alternate, or additional, wireless data communication protocols, including future standards or variations thereof.

In accordance with various embodiments, the base station 702 may be a base station such as but not limited to, an eNB, a serving eNB, a target eNB, a femto station, or a pico station, for example. The base station 702 can be an RN, a regular, a DeNB, a gNB, or an IAB donor. In some embodiments, the UE 701 may be embodied in various types of user devices such as a mobile phone, a smart phone, a personal digital assistant (PDA), tablet, laptop computer, wearable computing device, etc. The processor modules 714 and 736 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the method or algorithm disclosed herein can be embodied directly in hardware, in firmware, in a software module executed by processor modules 714 and 736, respectively, or in any practical combination thereof. The memory modules 716 and 734 may be realized as RAM memory, flash memory, ROM memory, EPROM memory, EEPROM memory, registers, a hard disk, a removable disk, a CD-ROM, or any other form of storage medium known in the art. In this regard, memory modules 716 and 734 may be coupled to the processor modules 710 and 730, respectively, such that the processors modules 710 and 730 can read information from, and write information to, memory modules 716 and 734, respectively. The memory modules 716 and 734 may also be integrated into their respective processor modules 710 and 730. In some embodiments, the memory modules 716 and 734 may each include a cache memory for storing temporary variables or other intermediate information during execution of instructions to be executed by processor modules 710 and 730, respectively. Memory modules 716 and 734 may also each include non-volatile memory for storing instructions to be executed by the processor modules 710 and 730, respectively.

The network communication module 718 generally represents the hardware, software, firmware, processing logic, and/or other components of the base station 702 that enable bi-directional communication between the transceiver 710 and other network components and communication nodes in communication with the base station 702. For example, the network communication module 718 may be configured to support internet or WiMAX traffic. In a deployment, without limitation, the network communication module 718 provides an 802.3 Ethernet interface such that the transceiver 710 can communicate with a conventional Ethernet based computer network. In this manner, the network communication module 718 may include a physical interface for connection to the computer network (e.g., Mobile Switching Center (MSC)). In some embodiments in which the base station 702 is an IAB donor, the network communication module 718 includes a fiber transport connection configured to connect the base station 702 to a core network. The terms "config-ured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

Figure 8:
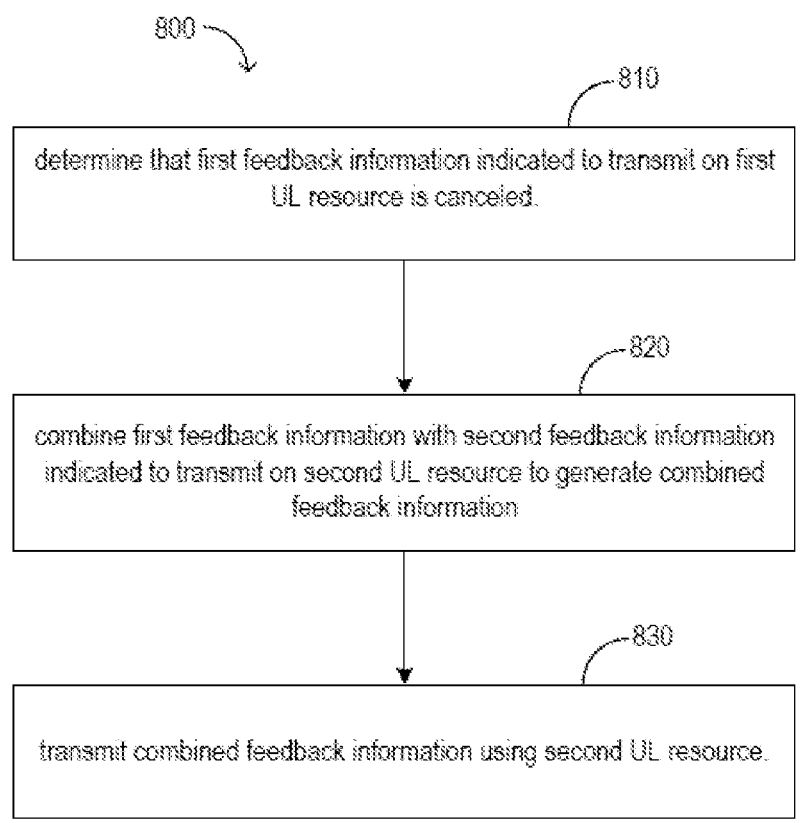
FIG. 8 illustrates a flowchart diagram illustrating a wireless communication method, in accordance with some embodiments of the present disclosure.

FIG. 8 illustrates a flowchart diagram illustrating a wireless communication method 800, in accordance with some embodiments of the present disclosure. Referring to FIGS. 1-8, the wireless communication method 800 is performed by the UE 701.

At 810, the UE 701 determines that first feedback information indicated to transmit on a first UL resource is canceled.

At 820, the UE 701 combines the first feedback information with second feedback information indicated to transmit on a second UL resource to generate combined feedback information. A first feedback codebook includes the first feedback information. A second feedback codebook includes the second feedback information. A combined feedback codebook includes the combined feedback information. The first UL resource is a PUCCH resource or a PUSCH resource. In some examples, the first UL resource is subsequent to the second UL resource. In other examples, the first UL resource is prior to the second UL resource.

For example, according to the first implementation, combining the first feedback information with second feedback information includes performing bit cascading with respect to bits of the first feedback information and the bits of the second feedback information. In some examples, according to the first implementation, combining the first feedback information with second feedback information includes performing an "OR" operation for a feedback bit in the first feedback information and a feedback bit in the second feedback information that correspond to each DL transmission that corresponds to both the first UL resource and the second UL resource.

In some examples, according to the second implementation, combining the first feedback information with second feedback information includes determining that DL transmission is associated with neither the first UL resource nor the second UL resource based on DCI. The combined feedback information includes NACK corresponding to the DL transmission. In some examples, according to the second implementation, combining the first feedback information with second feedback information includes determining that DL transmission is associated with either the first UL resource or the second UL resource based on DCI. Feedback information in the combined feedback information that corresponds to the DL transmission is determined based on whether the UE 701 correctly receives the DL transmission.

In some examples, according to the third implementation, whether time needed for PDSCH decoding and feedback information generation for DL transmission corresponding to the first UL resource and not the second UL resource exceeds a time threshold is determined. The first UL resource being subsequent to the second UL resource. NACK feedback is provided in response to determining that the time needed for the PDSCH decoding and the feedback information generation for the DL transmission exceeds the time threshold. The combined feedback information includes the NACK feedback. The time threshold is at least one of a pre-defined value in a communication protocol, a value configured by a base station, or a value determined by the UE 701 according to processing capability of the UE 701.

In some examples, according to the fourth implementation, whether time needed for PDSCH decoding and feedback information generation for DL transmission corresponding to the first UL resource and not the second UL resource exceeds a time threshold is determined. The first UL resource being subsequent to the second UL resource. Feedback for the DL transmission is omitted in response to determining that the time needed for the PDSCH decoding and the feedback information generation for the DL transmission exceeds the time threshold.

In some examples, according to the fifth implementation, the second UL resource from a plurality of UL resources is selected based on feedback bit overhead. One of the plurality of UL resources is prior to the first UL resource. Another one of the plurality of UL resources is subsequent to the first UL resource. In some examples, the second UL resource is selected based on a first number of DL slots corresponding to the first UL resource that overlaps with a second number of DL slots corresponding to the second UL resource. In some examples, the second UL resource is selected based on time needed for PDSCH decoding and feedback information generation for DL transmission corresponding to the first UL resource.

In some examples, according to the sixth implementation, feedback information for a DL transmission corresponding to the first UL resource and not to the second UL resource is omitted.

According to a seventh implementation, determining that the first feedback information indicated to transmit on the first UL resource is canceled includes determining that DL transmission corresponding to the first feedback information cannot be completed before a time boundary. The time boundary being defined based on processing capability of the UE 701. NACK feedback for the DL transmission is provided in response to determining that DL transmission corresponding to the first feedback information cannot be completed before a time boundary. In some examples, the first feedback information includes a newly added feedback bit corresponding to a DL transmission is associated with the first UL resource and not with the second UL resource. The newly added feedback bit is at an end of the combined feedback information.

At 830, the UE 701 transmits the combined feedback information using the second UL resource.

Figure 9:
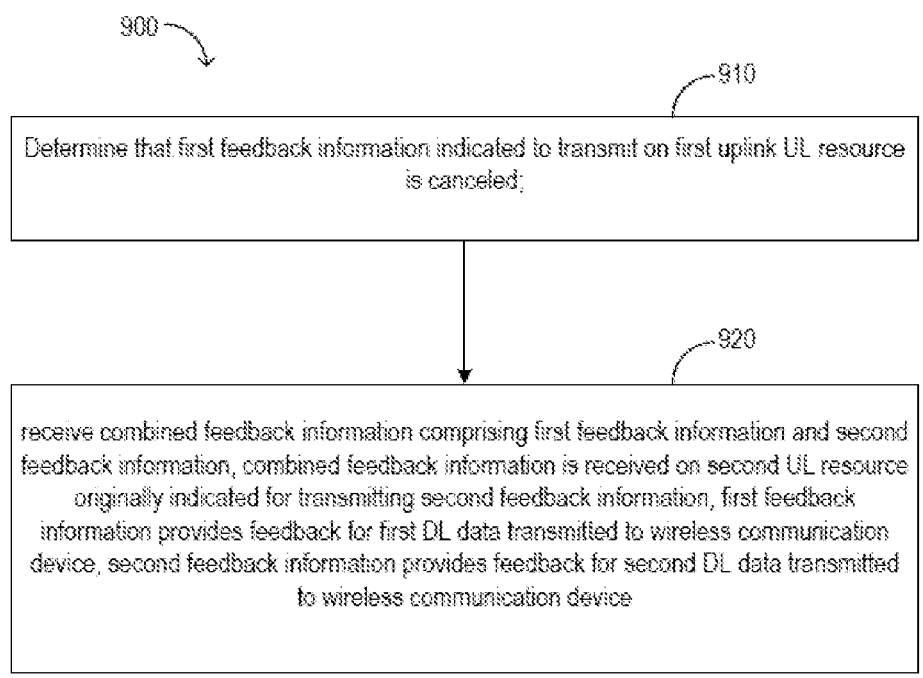
FIG. 9 illustrates a flowchart diagram illustrating a wireless communication method, in accordance with some embodiments of the present disclosure.

FIG. 9 illustrates a flowchart diagram illustrating a wireless communication method 900, in accordance with some embodiments of the present disclosure. Referring to FIGS. 1-9, the wireless communication method 900 is performed by the base station 702.

At 910, the base station 702 determines that first feedback information indicated to transmit on a first uplink UL resource is canceled in any suitable manner described herein.

At 920, the base station 702 receives from the UE 701 combined feedback information including the first feedback information and second feedback information. The combined feedback information is received on second UL resource originally indicated for transmitting the second feedback information. The first feedback information provides feedback for first DL data transmitted to the wireless communication device. The second feedback information provides feedback for second DL data transmitted to the wireless communication device.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

The invention claimed is:

1. A wireless communication method, comprising:
   determining, by a wireless communication device, that first feedback information indicated to transmit on a first uplink (UL) resource is canceled;
   combining, by the wireless communication device, the first feedback information with second feedback information indicated to transmit on a second UL resource to generate combined feedback information, wherein combining the first feedback information with the second feedback information comprises performing an "OR" operation on a feedback bit in the first feedback information and a feedback bit in the second feedback information, that each corresponds to a same downlink (DL) slot; and
   transmitting, by the wireless communication device, the combined feedback information using the second UL resource.

2. The wireless communication method of claim 1, wherein
   a first feedback codebook comprises the first feedback information;
   a second feedback codebook comprises the second feedback information;
   a combined feedback codebook comprises the combined feedback information.

3. The wireless communication method of claim 1, wherein the first UL resource is a physical uplink control channel (PUCCH) resource or a physical uplink shared channel (PUSCH) resource.

4. The wireless communication method of claim 1, wherein combining the first feedback information with second feedback information comprises:
   determining that a DL transmission is associated with neither the first UL resource nor the second UL resource based on DL control information (DCI); and
   the combined feedback information comprises NACK that is responsive to the DL transmission.

5. The wireless communication method of claim 1, wherein combining the first feedback information with second feedback information comprises:
   determining that a DL transmission is associated with either the first UL resource or the second UL resource based on DL control information (DCI); and
   feedback information in the combined feedback information that corresponds to the DL transmission is determined based on whether the wireless communication device correctly receives the DL transmission.

6. The wireless communication method of claim 1, further comprising:
   determining whether time needed for Physical Downlink Shared Channel (PDSCH) decoding and feedback information generation for DL transmission corresponding to the first UL resource and not the second UL resource exceeds a time threshold, the first UL resource being subsequent to the second UL resource; and
   providing NACK feedback in response to determining that the time needed for the PDSCH decoding and the feedback information generation for the DL transmission exceeds the time threshold, wherein the combined feedback information comprises the NACK feedback.

7. The wireless communication method of claim 6, wherein the time threshold is at least one of:
   a pre-defined value in a communication protocol;
   a value configured by a base station; or
   a value determined by the wireless communication device according to processing capability of the wireless communication device.

8. The wireless communication method of claim 1, further comprising:
   determining whether time needed for Physical Downlink Shared Channel (PDSCH) decoding and feedback information generation for DL transmission corresponding to the first UL resource and not the second UL resource exceeds a time threshold, the first UL resource being subsequent to the second UL resource; and
   omitting to provide feedback for the DL transmission in response to determining that the time needed for the PDSCH decoding and the feedback information generation for the DL transmission exceeds the time threshold.

9. The wireless communication method of claim 1, wherein
the first UL resource is subsequent to the second UL resource; or
the first UL resource is prior to the second UL resource.

10. The wireless communication method of claim 1, further comprising selecting the second UL resource from a plurality of UL resources based on feedback bit overhead,
wherein one of the plurality of UL resources is prior to the first UL resource, and another one of the plurality of UL resources is subsequent to the first UL resource.

11. The wireless communication method of claim 10, wherein the second UL resource is selected based on a first number of DL slots corresponding to the first UL resource that overlaps with a second number of DL slots corresponding to the second UL resource.

12. The wireless communication method of claim 10, wherein the second UL resource is selected based on time needed for Physical Downlink Shared Channel (PDSCH) decoding and feedback information generation for a DL transmission corresponding to the first UL resource.

13. The wireless communication method of claim 1, further comprising omitting to provide feedback information for a DL transmission corresponding to the first UL resource and not to the second UL resource.

14. The wireless communication method of claim 1, wherein determining that the first feedback information indicated to transmit on the first UL resource is canceled comprises determining that a DL transmission corresponding to the first feedback information cannot be completed before a time boundary, the time boundary being defined based on processing capability of the wireless communication device.

15. The wireless communication method of claim 14, further comprising:
providing NACK feedback for the DL transmission in response to determining that the DL transmission corresponding to the first feedback information cannot be completed before the time boundary.

16. The wireless communication method of claim 1, wherein
the first feedback information comprises a newly added feedback bit corresponding to a DL transmission is associated with the first UL resource and not with the second UL resource; and
the newly added feedback bit is at an end of the combined feedback information.

17. A wireless communication apparatus comprising:
at least one processor configured to:
determine that first feedback information indicated to transmit on a first uplink (UL) resource is canceled;
combine the first feedback information with second feedback information indicated to transmit on a second UL resource to generate combined feedback information, wherein combining the first feedback information with the second feedback information comprises performing an "OR" operation on a feedback bit in the first feedback information and a feedback bit in the second feedback information, that each corresponds to a same downlink (DL) slot; and
transmit the combined feedback information using the second UL resource.

18. A wireless communication method, comprising:
determining, by a base station, that first feedback information indicated to transmit on a first uplink (UL) resource is canceled;
receiving, by the base station from a wireless communication device, combined feedback information comprising the first feedback information and second feedback information, wherein
the combined feedback information is obtained by performing an "OR" operation on a feedback bit in the first feedback information and a feedback bit in the second feedback information, that each corresponds to a same downlink (DL) slot;
the combined feedback information is received on second UL resource originally indicated for transmitting the second feedback information;
the first feedback information provides feedback for first DL data transmitted to the wireless communication device; and
the second feedback information provides feedback for second DL data transmitted to the wireless communication device.

* * * * *